United States Patent
Qiang et al.

(10) Patent No.: US 10,733,097 B2
(45) Date of Patent: Aug. 4, 2020

(54) SHINGLED MAGNETIC RECORDING STORAGE SYSTEM WITH REDUCED TIME TO RECOVER

(71) Applicant: Seagate Technology LLC, Cupertino, CA (US)

(72) Inventors: Jian Qiang, Singapore (SG); Sze Chek Tan, Singapore (SG)

(73) Assignee: SEAGATE TECHNOLOGY LLC, Fremont, CA (US)

(*) Notice: Subject to any disclaimer, the term of this patent is extended or adjusted under 35 U.S.C. 154(b) by 154 days.

(21) Appl. No.: 15/910,750

(22) Filed: Mar. 2, 2018

(65) Prior Publication Data

US 2018/0314636 A1 Nov. 1, 2018

Related U.S. Application Data

(60) Provisional application No. 62/492,715, filed on May 1, 2017.

(51) Int. Cl.
| | |
|---|---|
| G06F 12/0804 | (2016.01) |
| G06F 12/0866 | (2016.01) |
| G11B 20/12 | (2006.01) |
| G11B 20/18 | (2006.01) |
| G11B 19/04 | (2006.01) |
| G06F 12/0875 | (2016.01) |

(52) U.S. Cl.
CPC ...... *G06F 12/0804* (2013.01); *G06F 12/0866* (2013.01); *G06F 12/0875* (2013.01); *G11B 19/04* (2013.01); *G11B 20/1217* (2013.01); *G11B 20/1816* (2013.01); *G06F 2212/1032* (2013.01); *G06F 2212/21* (2013.01); *G06F 2212/281* (2013.01); *G06F 2212/313* (2013.01); *G06F 2212/462* (2013.01); *G11B 2020/1238* (2013.01); *G11B 2020/1292* (2013.01)

(58) Field of Classification Search
CPC ............ G06F 12/0804; G06F 12/0866; G06F 12/0875; G06F 2212/1032; G06F 2212/21; G06F 2212/281; G06F 2212/313; G06F 2212/462; G11B 19/04; G11B 20/1217; G11B 20/1816; G11B 2020/1238; G11B 2020/1292
USPC ........................................................ 711/135
See application file for complete search history.

(56) References Cited

U.S. PATENT DOCUMENTS

| | | |
|---|---|---|
| 4,408,273 A | 10/1983 | Plow |
| 8,947,817 B1 | 2/2015 | Chung et al. |
| 9,443,553 B2 | 9/2016 | Kowles |

(Continued)

*Primary Examiner* — Reginald G Bragdon
*Assistant Examiner* — Aaron D Ho
(74) *Attorney, Agent, or Firm* — Holzer Patel Drennan

(57) ABSTRACT

The disclosed technology provides a method that reduces time to recover in storage systems. In one implementation, the method comprises entering an idle status, determining if there is an incomplete band update operation, invalidating a media scratch pad (MSP) by clearing headers responsive to determining there is no incomplete band update operation, performing a power cycle, reading an MSP header, and determining if an MSP header is valid. If a rude power cycle occurs and the MSP header is determined to be valid, an MSP is examined, and restored if required. If a safe power cycle occurs, an MSP restore operation is not required, reducing time to recover.

15 Claims, 4 Drawing Sheets

(56) References Cited

U.S. PATENT DOCUMENTS

| | | | |
|---|---|---|---|
| 2007/0028045 A1* | 2/2007 | Hung | G06F 3/0613 711/114 |
| 2013/0254457 A1* | 9/2013 | Mukker | G06F 11/1441 711/103 |
| 2015/0310892 A1* | 10/2015 | Kowles | G11B 20/1217 360/48 |
| 2016/0098352 A1* | 4/2016 | Tan | G06F 1/3212 711/135 |
| 2016/0154738 A1 | 6/2016 | Gaertner et al. | |

* cited by examiner

SHINGLED MAGNETIC RECORDING STORAGE SYSTEM WITH REDUCED TIME TO RECOVER

PRIORITY CLAIM

The present application claims priority to U.S. Patent Application Ser. No. 62/492,715 filed May 1, 2017, and titled "Shingled Magnetic Recording Storage System," which is hereby incorporated by reference in its entirety.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

SUMMARY

The technology disclosed herein provides a method that reduces time to recover (TTR) in storage systems. In one implementation, the method includes entering an idle status, determining if there is an incomplete band update operation, clearing media scratch pad (MSP) headers responsive to determining there is no incomplete band update operation, performing a power cycle, reading an MSP header, and determining if an MSP header is valid. If the MSP header is determined to be valid, an MSP is examined and restored, if required.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
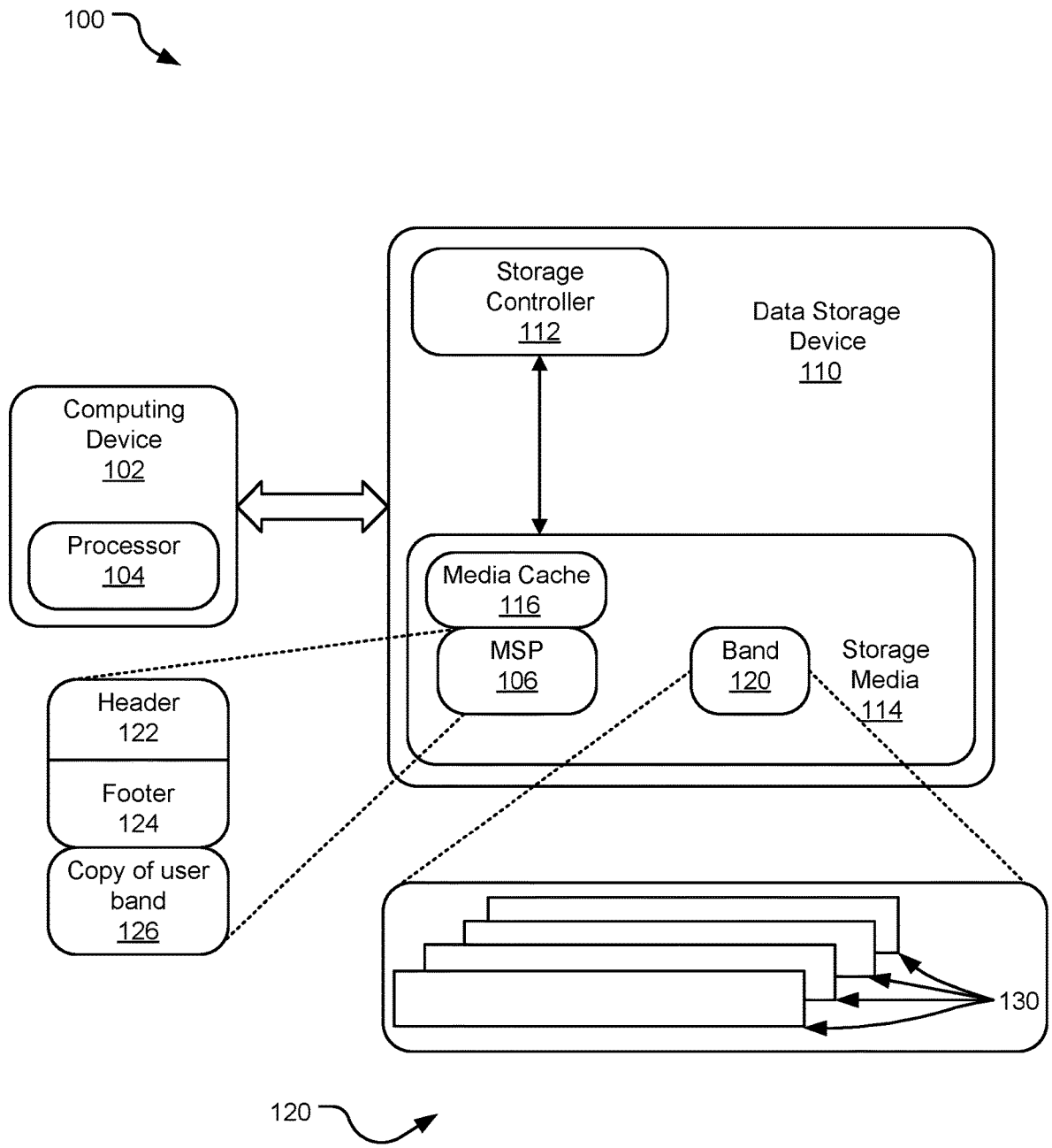
FIG. 1 is a block diagram of an example data storage system.

The present disclosure is directed to data storage systems that reduce the time to recover, also referred to as "time to ready," (TTR), in a shingled magnetic recording (SMR) drive. TTR includes hard disk drive spin up time plus initialization. In SMR with media cache technology, there is additional media cache reconstruction and media scratch pad (MSP) examination and restore before a drive reports a ready status to a host. The present disclosure is directed to data storage systems and methods that include reducing the redundant MSP examination process by clearing MSP headers in an idle state or standby/sleep command.

An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten.

In the following description, reference is made to the accompanying drawing that forms a part hereof and in which are shown by way of illustration at least one specific implementation. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an example data storage system 100, showing various functional components used to control the operation of a data storage device 110 (e.g., an SMR HDD, an SMR SSHD, an object storage device, etc.).

The data storage system 100 includes a computing or host device 102 (e.g., a computer, a mobile device, the internet, etc.) operably connected to the data storage device 110, each of the host device 102 and the data storage device 110 communicating with each other.

A processor 104 is located in the host device 102. The processor 104 sends one or more read or write commands to a storage device controller 112 for execution. As control communication paths are provided between a host device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

A band 120 of shingled tracks may also be located in the storage media 114. In FIG. 1, the shingled tracks 130 located in the band 120 are shown. An implementation of the shingled tracks 130 is arranged such that when data is written to one of the shingled tracks 130 (except for the last data track), a writing operation affects data on an adjacent track in a down-track direction.

The data storage device 110 further includes a cache 116 that is either a storage area on the storage media 114 or another non-volatile memory accessible by the data storage device 110. In the depicted system 100, the cache 116 is a storage area on the storage media 114.

The data storage device 110 may include a media scratch pad (e.g., a temporary cache) 106 within the cache 116, for temporarily storing data. When the data storage device 110 receives a write command from the host to write new data to data storage device 110, or when the data storage device 110 internally initiates a modify command to modify some existing data on data storage device 110, the data storage device 110 responds to the write and/or modify command(s) by reading and copying all of the data in the data band where the new material is to be written, e.g., band 120, to MSP 106. After band 120 is copied to the MSP 106, the data modified in MSP 106 with the new data and the modified data is read back from the MSP 106 and re-written to band 120, thus incorporating the new data associated with the write and/or the modify command. The MSP 106 includes metadata headers (e.g., header 122) and footers (e.g., footer 124).

When power becomes off during a band writing operation, during the next power-up operation, a track erased caused by a power cycle during a band updating operation may be recovered from a copy of pre-stored user band data in the MSP 106 (e.g., copy of user band data 126). In some implementations, there may be no band writing when the power is off, however, MSP examination still occurs to ensure that there is no data to restore. A complete band update operation includes reading a band, merging new data in memory, writing to the MSP 106, and writing back to the band. A rude power cycle during writing data back to the user band may create a whole track error due to incomplete band writing. A rude power cycle may be defined as an event when the power is turned off, often due to unexpected or uncontrollable circumstances, during one or more operations of the storage device are still incomplete. For example, one such rude power cycle may be when writing data to the band 120 is not complete. In such circumstances, MSP data can be used to store the band data in the copy of user band data 126. Headers and footers in the MSP 106 may be used to identify the corresponding user band ID during a power up operation. A header and a footer are required to match to indicate the user data in the MSP 106 is integrated.

In some implementations, a rude power cycle during a write operation to the MSP 106 write may cause a header/footer mismatch. In the case of a mismatch, a rude power cycle may occur before writing a band, and thus, the band data is safe and band updating can re-start from the beginning. In the case of a match, there is a possibility that the rude power cycle occurred during band writing, so the drive will read the user band to see if MSP 106 restore is needed. Even with a safe power cycle, the MSP 106 data remains valid, and the drive checks the user band to determine whether to restore the MSP 106 or not, causing a long TTR. The MSP examination process includes of multiple disc reads at headers and footers. As a result, the MSP examination process introduces approximately 200 ms in a drive's TTR, which delays performance expectations.

When a new SMR drive is received from a factory, the MSP has been cleared and the header is invalid. The MSP examination process only takes approximately 20 ms because it is not necessary to read the footers and the user band. The disclosed technology includes automatically clearing the MSP headers after a band update operation is completed. For example, the MSP headers may be cleared during an idle state or a standby command is received. During the next power up, the MSP restore will only read headers, which costs approximately 20 ms instead of approximately 200 ms. As a result, a drive's TTR may be reduced.

Figure 2:
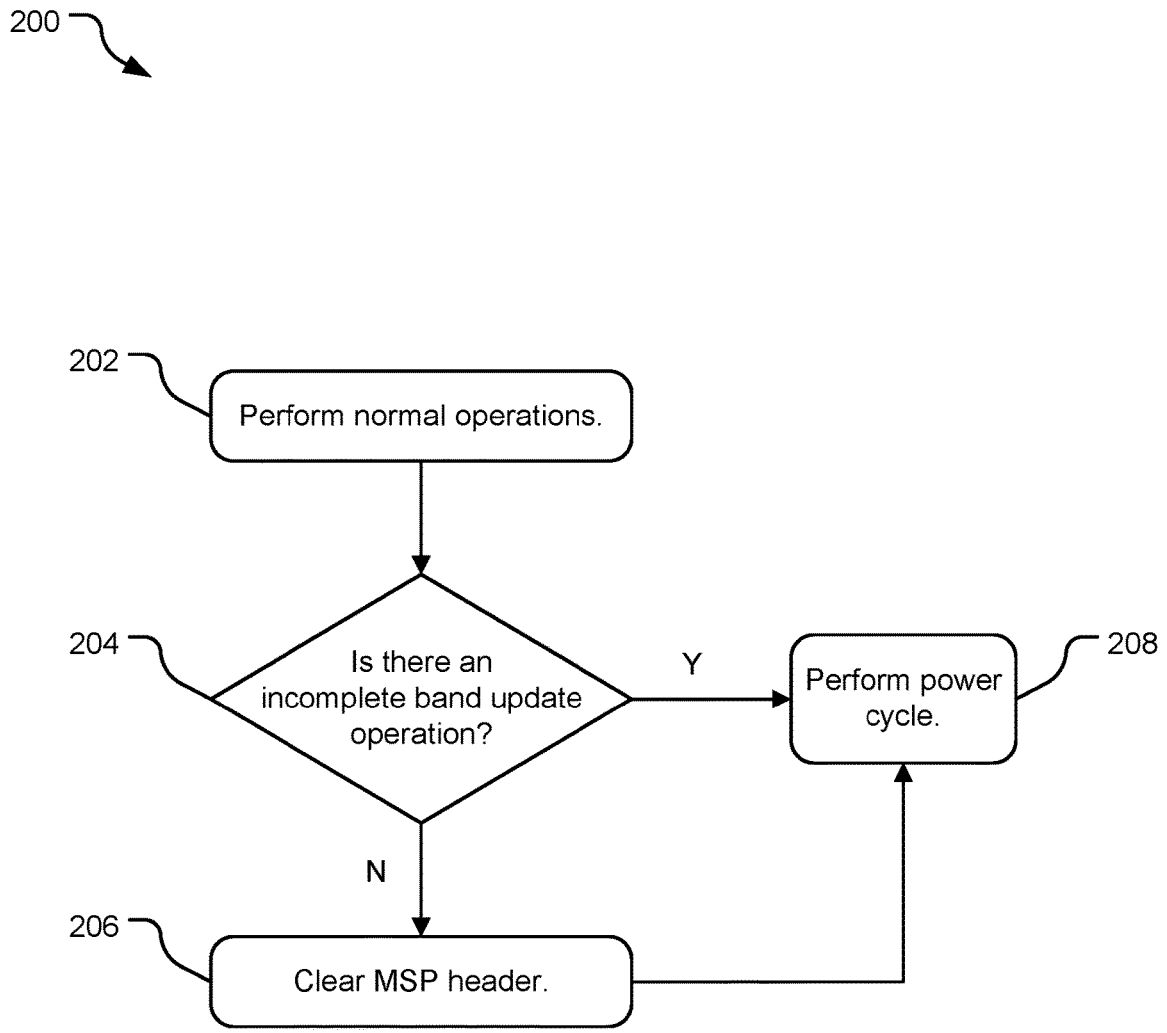
FIG. 2 is a flowchart of example operations for a time to ready (TTR) process.

FIG. 2 is a flowchart of example operations 200 for a reduced time to ready process performed by a storage controller in a data storage device of a data storage system. In the data storage system, an operation 202 performs normal operations. For example, normal operations may include reading an MSP header, determining header validity, reading an MSP footer, determining footer validity, reading a user band, reading an MSP band, copying an MSP to a user band if an error is found in the user band.

An operation 204 determines if there is an incomplete band update operation. In one implementation, the operation 204 may occur when the data storage device is entering an idle state. In another implementation, the operation 204 may occur when a standby command or a sleep command is received.

A complete band update operation includes write operations to MSP headers, MSP footers, an MSP band, and a user band. The MSP examination process includes of multiple disc reads at MSP header(s), MSP footer(s), the MSP band, and the user band. As a result, the MSP examination process may introduce approximately 200 ms in a drive's TTR, which delays performance expectations.

In the disclosed technology, if operation 204 determines that there is an active but incomplete band update operation, an operation 206 clears MSP headers located in a media scratch pad located in a cache of a storage media in the data storage device. An operation 208 performs a power cycle. If operation 204 determines that there is an incomplete band update operation, an operation 208 performs a power cycle and does not clear any MSP headers.

Figure 3:
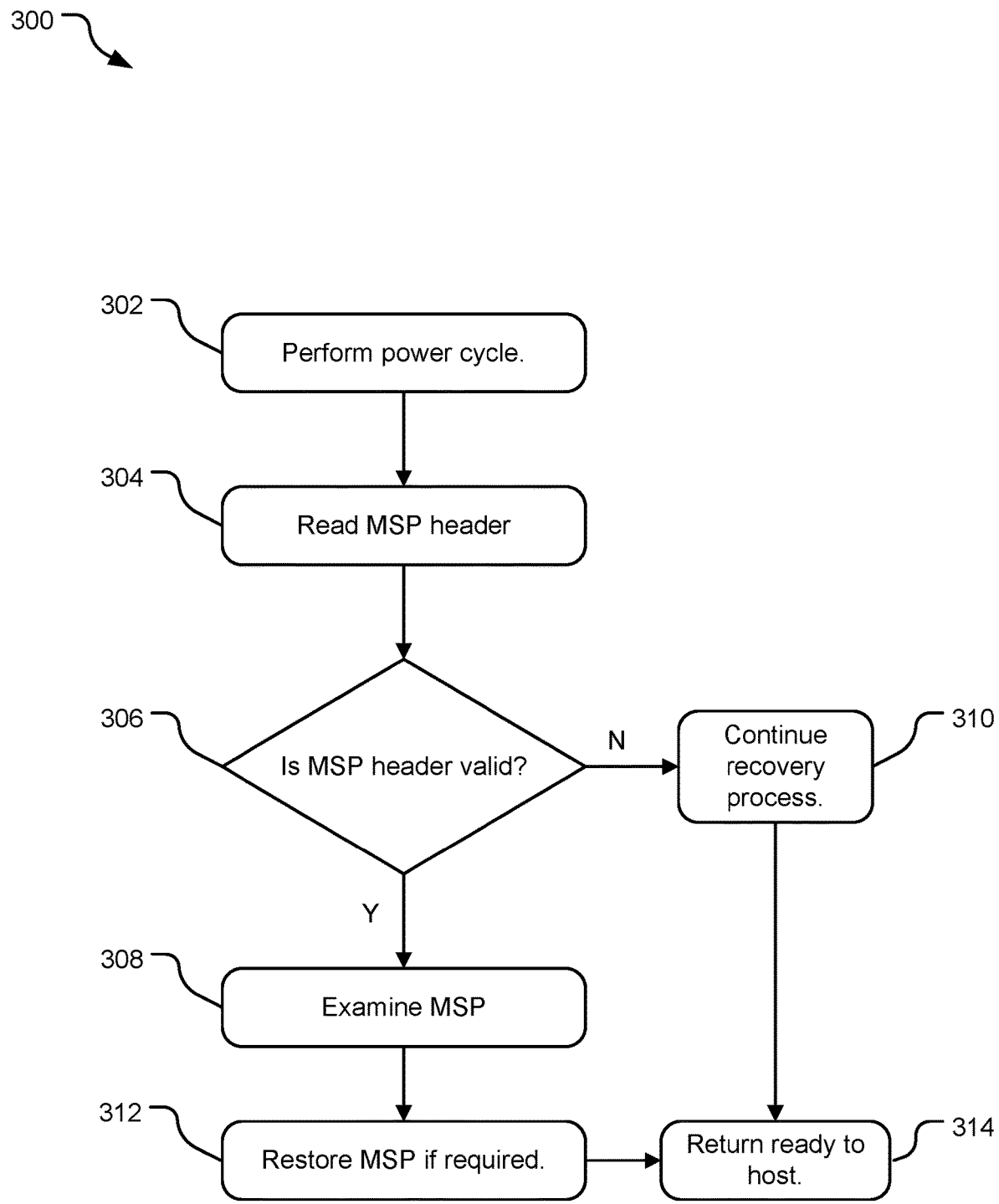
FIG. 3 is a flowchart of example operations for a TTR process.

FIG. 3 is a flowchart of example operations 300 for a reduced time to ready process performed by a storage controller in a data storage device of a data storage system. In a data storage system, an operation 302 perform a power cycle. An operation 304 reads an MSP header. An operation 306 determines if the MSP header is valid.

If operation 306 determines that the MSP header is valid (and headers not cleared), an operation 308 performs an examining MSP operation. After operation 308 performs the examining MSP operation, an operation 312 performs an MSP restore operation if required. An MSP restore operation may take approximately 500 ms to 1500 ms. In some implementations, a restore check operation may be performed before the MSP restore operation 312 occurs. After the operation 312 performs the restore operation, an operation 314 performs normal operations, for example, performing the remaining TTR process such as return ready to host operation.

If operation 306 determines that the MSP header is invalid, the MSP header has been cleared and the drive will bypass a restore operation. As a result, an operation 314 performs normal operations, for example, return ready to host operation. When the MSP headers are cleared and are invalid, the MSP examination process takes approximately 20 ms because it is not necessary to read the footers and the user band. As a result, TTR is significantly reduced.

Figure 4:
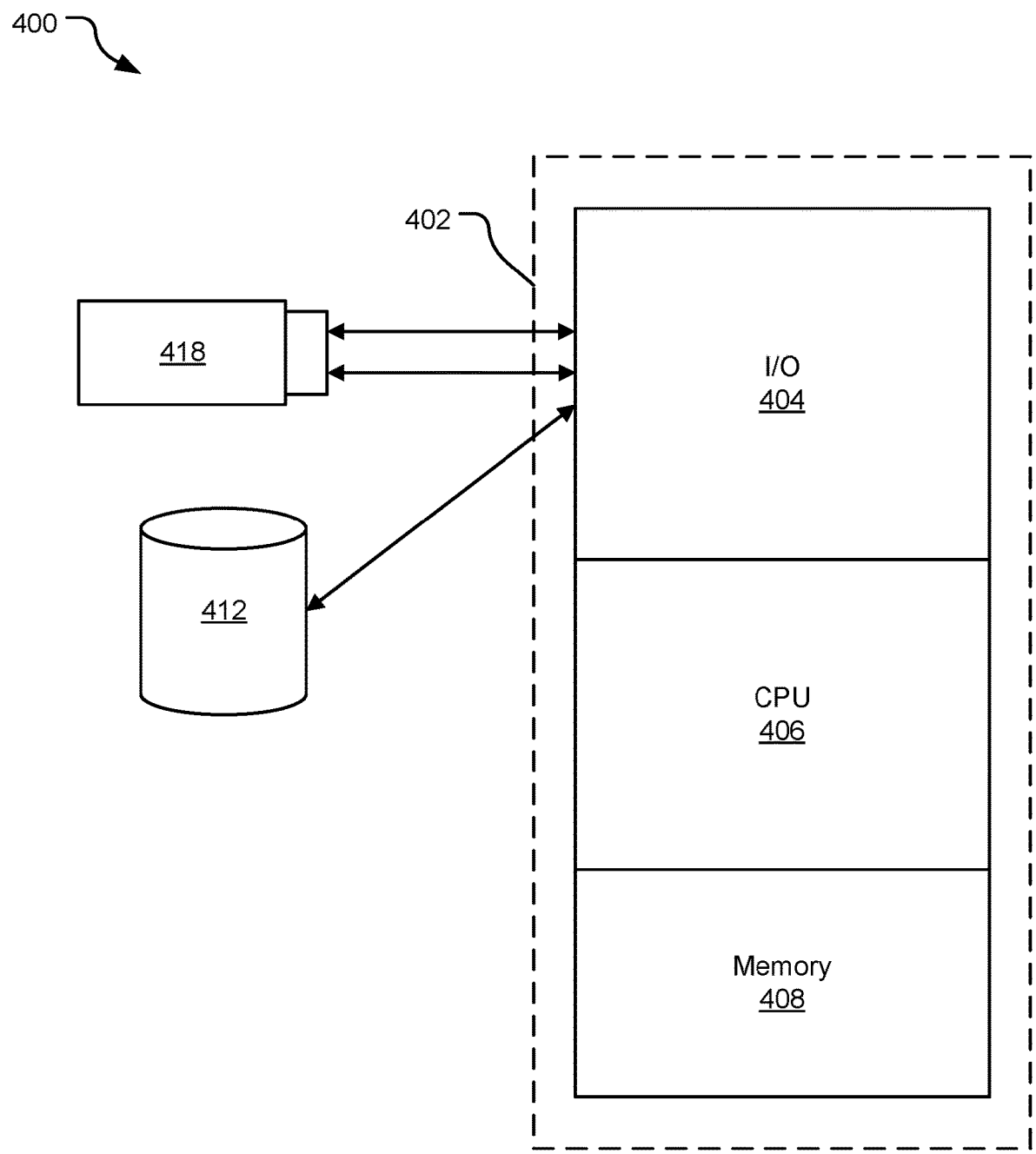
FIG. 4 is a block diagram of an example computer system suitable for implementing the technology disclosed herein.

FIG. 4 is a block diagram of an example computer system 400 suitable for implementing the disclosed TTR process. The computer system 400 is capable of executing a computer program product embodied in a tangible computer-readable storage medium to execute a computer process. The tangible computer-readable storage medium is not embodied in a carrier-wave or other signal. Data and program files may be input to computer system 400, which reads the files and executes the programs therein using one or more processors. Some of the elements of a computer system are shown in FIG. 4, where a processor 402 is shown having an input/output (I/O) section 404, a Central Processing Unit (CPU) 406, and a memory 408. There may be one or more processors 402, such that processor 402 of the computer system 400 has a single central-processing unit or a plurality of processing units. The computer system 400 further includes a controller, not shown in FIG. 4, configured to designate a plurality of non-contiguous storage areas on the storage media as media scratch pads; the controller may be software, firmware, or a combination thereof. The computer system 400 may be a conventional computer, a distributed computer, or any other type of computer. The described technology is optionally implemented in software loaded in memory 408, a disc storage unit 412, or removable memory 418.

In an example implementation, the selection of the media scratch pad may be embodied by instructions stored in memory 408 and/or disc storage unit 412 and executed by CPU 406. Further, local computing system, remote data sources and/or services, and other associated logic represent firmware, hardware, and/or software which may be configured to adaptively distribute workload tasks to improve system performance. The use of the media scratch pad may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 408 and/or disc storage unit 412 and executed by processor 402.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method for reduced time to recover in a storage device system, comprising:
    determining if there is an incomplete band update operation for a shingled magnetic recording storage medium;
    clearing media scratch pad (MSP) headers of a MSP of a cache of a storage media in the storage device system responsive to determining there is no incomplete band update operation for the shingled magnetic recording storage medium;
    in response to a power cycle of the storage media, reading an MSP header from the MSP of the cache in response to restoring power to the storage media subsequent to the power cycle;
    determining if the MSP header is valid; and
    performing a recovery process of the storage media to resume normal operation of the storage media responsive to determining the MSP header is an invalid MSP header, the recovery process proceeding without checking to determine whether a MSP restore is needed for the invalid MSP header.

2. The method of claim 1, wherein the determining if there is an incomplete band update operation is performed when a drive is entering an idle state.

3. The method of claim 1, wherein the determining if there is an incomplete band update operation is performed upon receiving at least one of a standby command and sleep command.

4. The method of claim 1, further comprising:
    performing a power cycle of the storage media.

5. The method of claim 1, further comprising:
    performing a ready to host operation.

6. The method of claim 1, further comprising:
    examining an MSP responsive to determining the MSP header is valid; and
    checking to determine whether a MSP restore is needed.

7. The method of claim 6, further comprising:
performing the MSP restore operation if required.

8. The method of claim 7, further comprising:
performing a ready to host operation subsequent to the examining, checking, and performing operations.

9. A storage device system with reduced time to recover, comprising:
a storage controller configured to:
determine if there is an incomplete band update operation in a shingled magnetic recording storage medium;
clear media scratch pad (MSP) headers of a MSP of a cache of a storage media in the storage device system responsive to determining there is no incomplete band update operation for the shingled magnetic recording storage medium;
in response to a power cycle of the storage media, read an MSP header from the MSP of the cache in response to restoring power to the storage media subsequent to the power cycle;
determine if the MSP header is valid; and
perform a recovery process of the storage media to resume normal operation of the storage media responsive to determining the MSP header is invalid without checking to determine whether a MSP restore is needed.

10. The storage device system of claim 9, wherein the storage controller is further configured to:
perform a power cycle of the storage media.

11. The storage device system of claim 9, wherein the storage controller is further configured to:
perform a ready to host operation.

12. One or more tangible computer-readable storage media encoding computer-executable instructions for executing on a computer system a computer process, the computer process comprising:
determining if there is an incomplete band update operation for a shingled magnetic recording storage medium;
clearing media scratch pad (MSP) headers of a MSP of a cache of a storage media in the shingled magnetic recording storage device system medium responsive to determining there is no incomplete band update operation for the shingled magnetic storage medium;
in response to a power cycle of the storage media, read an MSP header from the MSP of the cache in response to restoring power to the storage media subsequent to the power cycle;
determine if the MSP header is valid; and
perform a recovery process of the storage media to resume normal operation of the storage media responsive to determining the MSP header is an invalid MSP header, the recovery process proceeding without checking to determine whether a MSP restore is needed for the invalid MSP header.

13. The one or more tangible computer-readable storage media of claim 12, further comprising:
performing a power cycle of the storage media.

14. The one or more tangible computer-readable storage media of claim 13, further comprising:
performing a ready to host operation.

15. The one or more tangible computer-readable storage media of claim 13, further comprising:
examining an MSP responsive to determining the MSP header is valid;
restoring the MSP; and
performing a ready to host operation.

* * * * *

UNITED STATES PATENT AND TRADEMARK OFFICE
CERTIFICATE OF CORRECTION

PATENT NO. : 10,733,097 B2  
APPLICATION NO. : 15/910750  
DATED : August 4, 2020  
INVENTOR(S) : Jian Qiang and Sze Chek Tan It is certified that error appears in the above-identified patent and that said Letters Patent is hereby corrected as shown below:

In the Claims

In Column 8, Line 7, Claim 12, delete "device system".

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*